Oct. 2, 1956 L. W. JOHNSON 2,764,921
SOIL CONDITIONING MACHINE
Filed Oct. 26, 1953 2 Sheets-Sheet 1
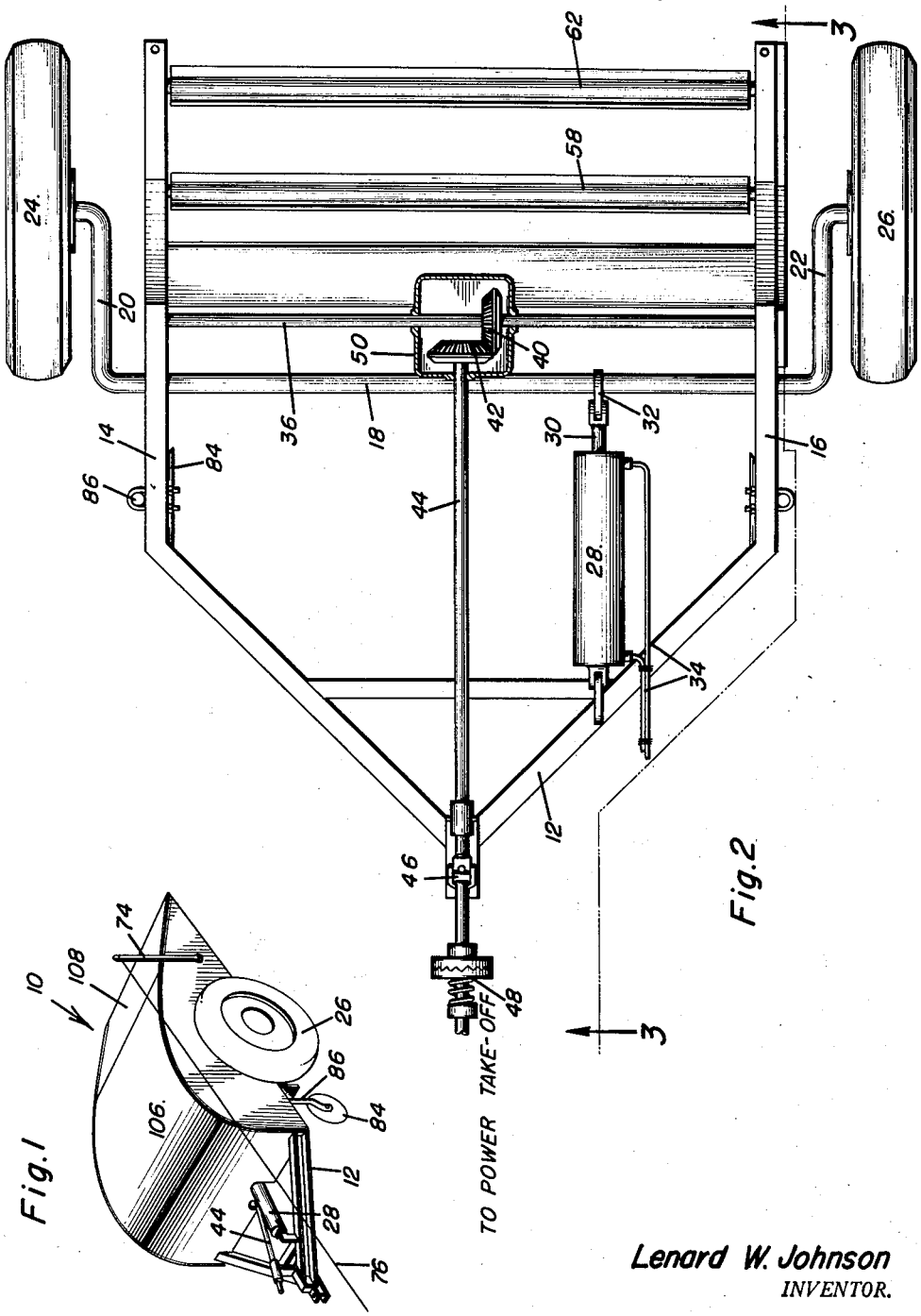
Lenard W. Johnson
INVENTOR.

Oct. 2, 1956    L. W. JOHNSON    2,764,921
SOIL CONDITIONING MACHINE
Filed Oct. 26, 1953    2 Sheets-Sheet 2
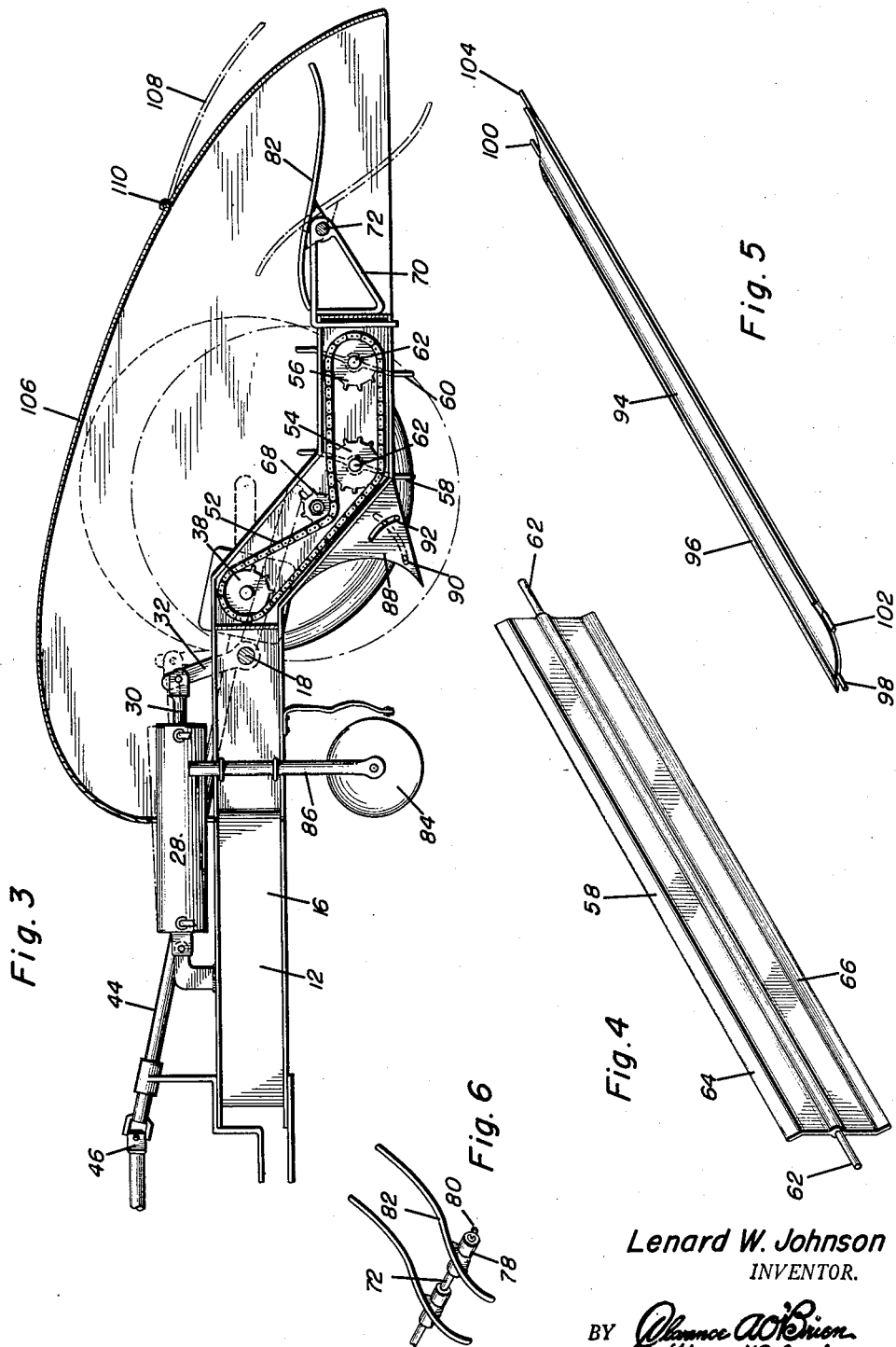
Lenard W. Johnson
INVENTOR.

United States Patent Office 2,764,921
Patented Oct. 2, 1956

2,764,921

SOIL CONDITIONING MACHINE

Lenard W. Johnson, Roseau, Minn.

Application October 26, 1953, Serial No. 388,079

1 Claim. (Cl. 97—10)

This invention relates to agricultural equipment and more particularly to a novel soil conditioning machine.

The primary object of this invention resides in the provision of an apparatus for pulverizing soil and for removing foreign matter, such as rocks, stones, and roots from the soil whereby a better crop yield may be obtained.

The construction of this invention features a novel arrangement of parts whereby the soil may be cut and then beat so as to pulverize the soil. A special rack is provided for receiving and holding stones, rocks, roots, and the like, and this rack includes means for adjustment whereby the rack will support the stones, and the like, of a particular size.

Still further objects and features of this invention reside in the provision of a soil conditioning apparatus that is strong and durable, simple in construction and manufacture, provided with a hood for protecting the working parts thereof, and which includes a novel cutting blade and cutting blade holders that are suspended from the frame and adapted to hold the cutting blade in position.

These together with the various ancillary objects and features of the invention which will become apparent as the following description proceeds, are attained by this soil conditioning apparatus, a preferred embodiment of which has been illustrated in the accompanying drawings, by way of example only, wherein:

Figure 1 is a perspective view of the soil conditioning apparatus comprising the present invention;

Figure 2 is a top plan view of this agricultural implement;

Figure 3 is a vertical sectional view as taken along the plane of line 3—3 in Figure 2;

Figure 4 is a perspective view of one of the beater blades utilized in the present invention;

Figure 5 is a perspective view of the cutting blade providing one of the means for conditioning the soil; and Figure 6 is a perspective view of a section of the rack utilized for supporting foreign matters such as stones, rocks, and the like.

With continuing reference to the accompanying drawings wherein like reference numerals designate similar parts throughout the various views, reference numeral 10 generally designates the soil conditioning apparatus employed in the present invention which includes a frame 12 of suitable configuration, the construction of which can be best seen in Figure 2. The frame 12 includes a pair of side frame members 14 and 16 within which an axle 18 having offset end portions 20 and 22 is journaled. Secured through the end portions 20 and 22 of the axle 18 are wheels 24 and 26 which are freely rotatable about the axle.

Mounted on the frame 12 is an hydraulic cylinder 28 which comprises means for rotating the axle 18 thereby raising or lowering the wheels 24 and 26 relative to the frame 12 to adjust the height of the frame and the plowing elements above the ground and to enable the soil conditioning apparatus to be transported along the highway. The cylinder 28 has a piston rod 30 connected to a bracket 32 attached to the axle 18. Hydraulic lines as indicated at 34 are connected to a pressure reservoir and provide the power necessary for actuating the piston rod 30 to rotate the axle 18.

The shaft 36 is journaled in the side frame members 14 and 16 and carries a sprocket wheel 38. The shaft 36 is rotated by means of a bevel gear 40 mounted thereon which engages another bevel gear 42 mounted on a drive member 44 which is connected by means of a universal joint 46 and a spring slip overrunning clutch assembly 48 to the power takeoff of a tractor or like pulling vehicle for the soil conditioning apparatus 10. The bevel gears 40 and 42 may be encased in a suitable transmission housing 50.

Entrained about the sprocket 38 is an endless chain 52 which is entrained about the sprocket wheels 54 and 56, which are mounted on the stub shaft ends of the beater blades 58 and 60 the stub shaft ends being generally designated by reference numeral 62. Thus, the chain 52 will drive the sprockets 54 and 56 to rotate the beater blades 58 and 60 which are provided with angularly offset portions as at 64 and 66 for engaging and pulverizing the soil. An idler sprocket which is preferably spring pressed and which is generally indicated at 68 is provided for holding the chain 52 taut.

Secured to the frame 12 by means of triangular shaped brackets as at 70 is a rod 72 which is rotatably mounted in the bracket 70. This rod 72 has an operating lever 74 provided therefor which is connected by a suitable cable 76 or the like to a locking lever carried on the pulling vehicle whereby the rod 72 may be held in a selected position. Secured on the rod 72 are a plurality of sleeves 78 held by setscrews as at 80. These sleeves are slidable on the rod 72 so that the tines 82 of arcuate configuration carried by the sleeves 78 may be adjusted in a selected spaced relationship whereby the tines 82 form a rack for holding stones, rocks, roots, and the like, which may be thrown thereon by the beater blades 58 and 60.

In order to cut the soil before the pulverizing beater blades 58 engage the soil, there are provided a plurality of discs 84 which are suitably mounted on standards 86 secured to the frame 12. Additionally, a pair of spaced cutting blade holders 88 are secured to the frame 12 and have apertures as at 90 and slots 92 of arcuate configuration therein. A cutting blade 94 of arcuate configuration and having a cutting edge 96 is supported by the cutting blade holders 98. Pins 98, 100, 102, and 104, are attached to the cutting blade 94 with the pins 98 and 100 extending through the apertures 90 and the pins 102 and 104 extending through the slots 92 whereby the cutting blade 94 may rotate somewhat dependent upon the condition of the soil.

A hood 106 is secured over the operating portions of this soil conditioning apparatus and an end door 108 is hingedly secured as at 110 to the hood 106 whereby access to the rack formed by the tines 82 can be readily had. Further, upon release of the cable 76, the lever 74 will allow any material carried by the rack formed by the tines 82, to be dumped.

Since from the foregoing the construction and advantages of this soil conditioning apparatus are readily apparent, further description is believed to be unnecessary.

However, since numerous modifications will readily occur to those skilled in the art, after a consideration of the foregoing specification and accompanying drawings, it is not intended to limit the invention to the precise embodiment shown and described, but all suitable modifications and equivalents may be readily resorted to.

What is claimed as new is as follows:

A soil conditioning machine comprising a frame, an axle journaled in said frame and having wheels rotatably attached to offset end portions of said axle, means for rotating said axle carried by said frame, a shaft journaled in said frame, means for driving said shaft, a plurality of soil beaters journaled in said frame, means drivingly connecting said shaft to said soil beaters to drive said soil beaters when said shaft is rotating, and a rack carried by said frame behind said soil beaters, said rack including a rod rotatably carried by said frame, said rack having a plurality of tines secured thereon in spaced relationship, said tines being mounted on sleeves slidably adjustably secured on said rod, said tines being arcuate in configuration, and means for selectively holding said rod in a position where said tines are substantially horizontal, said means for driving said shaft including an overrunning clutch arrangement for connecting a drive member to the power takeoff of a tractor, a first bevel gear on said drive member, said first bevel gear engaging a second bevel gear on said shaft, said means drivingly connecting said shaft to said soil beaters comprising sprockets secured to said shaft and said soil beaters, and an endless chain entraining over all of said sprockets, discs suspended from said frame and a cutting blade suspended from cutting blade holders attached to said frame in front of said beaters, said cutting blade holders having opposed apertures and slots therein, said cutting blade having pins engageable in said slots and said apertures.

References Cited in the file of this patent

UNITED STATES PATENTS

| | | |
|---|---|---|
| 884,258 | Baker | Apr. 7, 1908 |
| 1,468,388 | Moore | Sept. 18, 1923 |
| 1,698,724 | Johnston et al. | Jan. 15, 1929 |
| 2,025,494 | Ariens | Dec. 24, 1935 |
| 2,323,412 | Noble | July 6, 1943 |
| 2,523,263 | Anderson | Sept. 26, 1950 |